(12) United States Patent
Doyle

(10) Patent No.: US 11,797,526 B2
(45) Date of Patent: Oct. 24, 2023

(54) DATA STRUCTURES AND METHODS FOR ELECTRONICALLY RECORDING EVENTS

(71) Applicant: SHOPIFY INC., Ottawa (CA)

(72) Inventor: Benjamin Alfred Lucas Doyle, Ottawa (CA)

(73) Assignee: SHOPIFY INC., Ottawa (CA)

( * ) Notice: Subject to any disclaimer, the term of this patent is extended or adjusted under 35 U.S.C. 154(b) by 134 days.

(21) Appl. No.: 17/476,623

(22) Filed: Sep. 16, 2021

(65) Prior Publication Data
US 2023/0079370 A1 Mar. 16, 2023

(51) Int. Cl.
*G06F 16/20* (2019.01)
*G06F 16/23* (2019.01)

(52) U.S. Cl.
CPC ................. *G06F 16/2379* (2019.01)

(58) Field of Classification Search
CPC .................................................. G06F 16/2379
USPC ......................................................... 707/703
See application file for complete search history.

(56) References Cited

U.S. PATENT DOCUMENTS

| | | | | |
|---|---|---|---|---|
| 7,774,388 | B1 * | 8/2010 | Runchey | G06F 16/95 707/811 |
| 2006/0036484 | A1 * | 2/2006 | Voticky | G06Q 30/0231 705/14.31 |
| 2009/0018877 | A1 * | 1/2009 | Houck | G06Q 10/00 705/7.11 |
| 2017/0185933 | A1 * | 6/2017 | Adulyasak | G06Q 10/087 |
| 2022/0053012 | A1 * | 2/2022 | Nishijima | G06F 21/55 |

* cited by examiner

*Primary Examiner* — Vincent F Boccio

(57) ABSTRACT

It may be desired to query a large record of events to retrieve certain segments of the data that provide information of interest. However, the data might not be structured such that it is conducive to generate/execute queries that inquire about net changes of events over time. Query language may also be interpreted differently by different analysts. In some embodiments data related to events is assembled into a data structure having a format logically equivalent to a double entry transition table. Each event may have two entries in the table: a first entry representing the event as a transition from a previous state to a current state, and a second entry representing the reverse transition of the first entry. In some embodiments, a query executor tool may be provided as a graphical user interface for entering information of interest to be queried.

20 Claims, 15 Drawing Sheets

Table 2A

309

| Shop ID | Transition Time Stamp | Index | Repeat Customer Purchases |
|---|---|---|---|
| A | Sat Apr 3, 2021, 09:34 | A-1 | 1 |
| A | Sat Apr 3, 2021, 17:25 | A-3 | 2 |
| A | Sun Apr 4, 2021, 20:54 | A-6 | 3 |

402 → row 1
404 → row 2

Table 2B

| Shop ID | Transition Time Stamp | Index | Purchase on Mobile App |
|---|---|---|---|
| A | Sat Apr 3, 2021, 10:10 | A-2 | 1 |
| A | Sat Apr 3, 2021, 17:25 | A-4 | 2 |
| A | Sun Apr 4, 2021, 20:54 | A-7 | 3 |
| A | Sun Apr 4, 2021, 21:13 | A-8 | 4 |

406 → row 1

Table 2C

| Shop ID | Transition Time Stamp | Index | Blog Activation (FALSE as of Apr 3 00:00) |
|---|---|---|---|
| A | Sat Apr 3, 2021, 20:15 | A-5 | TRUE |

FIG. 2

Table 3A

309

| Shop ID | Transition Time Stamp | Index | Repeat Customer Purchases |
|---|---|---|---|
| B | Sat Apr 3, 2021, 20:44 | B-3 | 1 |

Table 3B

| Shop ID | Transition Time Stamp | Index | Purchase on Mobile App |
|---|---|---|---|
| B | Sat Apr 3, 2021, 10:10 | B-1 | 1 |

Table 3C

| Shop ID | Transition Time Stamp | Index | Blog Activation (FALSE as of Apr 3 00:00) |
|---|---|---|---|
| B | Sat Apr 3, 2021, 10:12 | B-2 | TRUE |
| B | Sun Apr 4, 2021, 17:43 | B-4 | FALSE |

Table 4A

| Shop ID | Transition Time Stamp | Index | Repeat Customer Purchases |
|---|---|---|---|
| C | Sun Apr 4, 2021, 07:35 | C-4 | 1 |
| C | Sun Apr 4, 2021, 11:22 | C-5 | 2 |
| C | Sun Apr 4, 2021, 21:40 | C-7 | 3 |

Table 4B

| Shop ID | Transition Time Stamp | Index | Purchase on Mobile App |
|---|---|---|---|
| C | Sat Apr 3, 2021, 10:10 | C-1 | 1 |
| C | Sat Apr 3, 2021, 17:25 | C-2 | 2 |
| C | Sun Apr 4, 2021, 20:54 | C-6 | 3 |

Table 4C

| Shop ID | Transition Time Stamp | Index | Blog Activation (TRUE as of Apr 3 00:00) |
|---|---|---|---|
| C | Sat Apr 3, 2021, 18:15 | C-3 | FALSE |

FIG. 4

| | Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State |
|---|---|---|---|---|---|---|---|---|---|---|
| 1 | A | Apr 3 09:34 | A-1 | +1 | 0 | 1 | 0 | 0 | FALSE | FALSE |
| 2 | A | Apr 3 09:34 | A-1 | -1 | 1 | 0 | 0 | 0 | FALSE | FALSE |
| 3 | A | Apr 3 10:10 | A-2 | +1 | 1 | 1 | 0 | 1 | FALSE | FALSE |
| 4 | A | Apr 3 10:10 | A-2 | -1 | 1 | 1 | 1 | 0 | FALSE | FALSE |
| 5 | A | Apr 3 17:25 | A-3 | +1 | 1 | 2 | 1 | 1 | FALSE | FALSE |
| 6 | A | Apr 3 17:25 | A-3 | -1 | 2 | 1 | 1 | 1 | FALSE | FALSE |
| 7 | A | Apr 3 17:25 | A-4 | +1 | 2 | 2 | 1 | 2 | FALSE | FALSE |
| 8 | A | Apr 3 17:25 | A-4 | -1 | 2 | 2 | 2 | 1 | FALSE | FALSE |
| 9 | A | Apr 3 20:15 | A-5 | +1 | 2 | 2 | 2 | 2 | FALSE | TRUE |
| 10 | A | Apr 3 20:15 | A-5 | -1 | 2 | 2 | 2 | 2 | TRUE | FALSE |
| 11 | A | Apr 4 20:54 | A-6 | +1 | 2 | 3 | 2 | 2 | TRUE | TRUE |
| 12 | A | Apr 4 20:54 | A-6 | -1 | 3 | 2 | 2 | 2 | TRUE | TRUE |
| 13 | A | Apr 4 20:54 | A-7 | +1 | 3 | 3 | 2 | 3 | TRUE | TRUE |
| 14 | A | Apr 4 20:54 | A-7 | -1 | 3 | 3 | 3 | 2 | TRUE | TRUE |
| 15 | A | Apr 4 21:13 | A-8 | +1 | 3 | 3 | 3 | 4 | TRUE | TRUE |
| 16 | A | Apr 4 21:13 | A-8 | -1 | 3 | 3 | 4 | 3 | TRUE | TRUE |
| 17 | B | Apr 3 10:10 | B-1 | +1 | 0 | 0 | 0 | 1 | FALSE | FALSE |
| 18 | B | Apr 3 10:10 | B-1 | -1 | 0 | 0 | 1 | 0 | FALSE | FALSE |
| 19 | B | Apr 3 10:12 | B-2 | +1 | 0 | 0 | 1 | 1 | FALSE | TRUE |
| 20 | B | Apr 3 10:12 | B-2 | -1 | 0 | 0 | 1 | 1 | TRUE | FALSE |
| 21 | B | Apr 3 20:44 | B-3 | +1 | 0 | 1 | 1 | 1 | TRUE | TRUE |
| 22 | B | Apr 3 20:44 | B-3 | -1 | 1 | 0 | 1 | 1 | TRUE | TRUE |
| 23 | B | Apr 4 17:43 | B-4 | +1 | 1 | 1 | 1 | 1 | TRUE | FALSE |
| 24 | B | Apr 4 17:43 | B-4 | -1 | 1 | 1 | 1 | 1 | FALSE | TRUE |
| 25 | C | Apr 3 10:10 | C-1 | +1 | 0 | 0 | 0 | 1 | TRUE | TRUE |
| 26 | C | Apr 3 10:10 | C-1 | -1 | 0 | 0 | 1 | 0 | TRUE | TRUE |
| 27 | C | Apr 3 17:25 | C-2 | +1 | 0 | 0 | 1 | 2 | TRUE | TRUE |
| 28 | C | Apr 3 17:25 | C-2 | -1 | 0 | 0 | 2 | 1 | TRUE | TRUE |
| 29 | C | Apr 3 18:15 | C-3 | +1 | 0 | 0 | 2 | 2 | TRUE | FALSE |
| 30 | C | Apr 3 18:15 | C-3 | -1 | 0 | 0 | 2 | 2 | FALSE | TRUE |
| 31 | C | Apr 4 07:35 | C-4 | +1 | 0 | 1 | 2 | 2 | FALSE | FALSE |
| 32 | C | Apr 4 07:35 | C-4 | -1 | 1 | 0 | 2 | 2 | FALSE | FALSE |
| 33 | C | Apr 4 11:22 | C-5 | +1 | 1 | 2 | 2 | 2 | FALSE | FALSE |
| 34 | C | Apr 4 11:22 | C-5 | -1 | 2 | 1 | 2 | 2 | FALSE | FALSE |
| 35 | C | Apr 4 20:54 | C-6 | +1 | 2 | 2 | 2 | 3 | FALSE | FALSE |
| 36 | C | Apr 4 20:54 | C-6 | -1 | 2 | 2 | 3 | 2 | FALSE | FALSE |
| 37 | C | Apr 4 21:40 | C-7 | +1 | 2 | 3 | 3 | 3 | FALSE | FALSE |
| 38 | C | Apr 4 21:40 | C-7 | -1 | 3 | 2 | 3 | 3 | FALSE | FALSE |

FIG. 5

| | Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State |
|---|---|---|---|---|---|---|---|---|---|---|
| 9 | A | Apr 3 20:15 | A-5 | +1 | 2 | 2 | 2 | 2 | FALSE | TRUE |
| 11 | A | Apr 4 20:54 | A-6 | +1 | 2 | 3 | 2 | 2 | TRUE | TRUE |
| 12 | A | Apr 4 20:54 | A-6 | -1 | 3 | 2 | 2 | 2 | TRUE | TRUE |
| 13 | A | Apr 4 20:54 | A-7 | +1 | 3 | 3 | 2 | 3 | TRUE | TRUE |
| 14 | A | Apr 4 20:54 | A-7 | -1 | 3 | 3 | 3 | 2 | TRUE | TRUE |
| 15 | A | Apr 4 21:13 | A-8 | +1 | 3 | 3 | 3 | 4 | TRUE | TRUE |
| 16 | A | Apr 4 21:13 | A-8 | -1 | 3 | 3 | 4 | 3 | TRUE | TRUE |
| 19 | B | Apr 3 10:12 | B-2 | +1 | 0 | 0 | 1 | 1 | FALSE | TRUE |
| 21 | B | Apr 3 20:44 | B-3 | +1 | 0 | 1 | 1 | 1 | TRUE | TRUE |
| 22 | B | Apr 3 20:44 | B-3 | -1 | 1 | 0 | 1 | 1 | TRUE | TRUE |
| 24 | B | Apr 4 17:43 | B-4 | -1 | 1 | 1 | 1 | 1 | FALSE | TRUE |
| 25 | C | Apr 3 10:10 | C-1 | +1 | 0 | 0 | 0 | 1 | TRUE | TRUE |
| 26 | C | Apr 3 10:10 | C-1 | -1 | 0 | 0 | 1 | 0 | TRUE | TRUE |
| 27 | C | Apr 3 17:25 | C-2 | +1 | 0 | 0 | 1 | 2 | TRUE | TRUE |
| 28 | C | Apr 3 17:25 | C-2 | -1 | 0 | 0 | 2 | 1 | TRUE | TRUE |
| 30 | C | Apr 3 18:15 | C-3 | -1 | 0 | 0 | 2 | 2 | FALSE | TRUE |

FIG. 6

| | Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State |
|---|---|---|---|---|---|---|---|---|---|---|
| 11 | A | Apr 4 20:54 | A-6 | +1 | 2 | 3 | 2 | 2 | TRUE | TRUE |
| 13 | A | Apr 4 20:54 | A-7 | +1 | 3 | 3 | 2 | 3 | TRUE | TRUE |
| 14 | A | Apr 4 20:54 | A-7 | -1 | 3 | 3 | 3 | 2 | TRUE | TRUE |
| 15 | A | Apr 4 21:13 | A-8 | +1 | 3 | 3 | 3 | 4 | TRUE | TRUE |
| 16 | A | Apr 4 21:13 | A-8 | -1 | 3 | 3 | 4 | 3 | TRUE | TRUE |
| 37 | C | Apr 4 21:40 | C-7 | +1 | 2 | 3 | 3 | 3 | FALSE | FALSE |

FIG. 7

| Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State |
|---|---|---|---|---|---|---|---|---|---|
| 9 | A | Apr 3 20:15 | A-5 | +1 | 2 | 2 | 2 | 2 | FALSE | TRUE |
| 11 | A | Apr 4 20:54 | A-6 | +1 | 2 | 3 | 2 | 2 | TRUE | TRUE |
| 12 | A | Apr 4 20:54 | A-6 | -1 | 3 | 2 | 2 | 2 | TRUE | TRUE |
| 13 | A | Apr 4 20:54 | A-7 | +1 | 3 | 3 | 2 | 3 | TRUE | TRUE |
| 14 | A | Apr 4 20:54 | A-7 | -1 | 3 | 3 | 3 | 2 | TRUE | TRUE |
| 15 | A | Apr 4 21:13 | A-8 | +1 | 3 | 3 | 3 | 4 | TRUE | TRUE |
| 16 | A | Apr 4 21:13 | A-8 | -1 | 3 | 3 | 4 | 3 | TRUE | TRUE |

FIG. 8

| Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State | Previous Homepage Visits State | Current Homepage Visits State |
|---|---|---|---|---|---|---|---|---|---|---|---|
| B | Apr 3 10:10 | B-1 | +1 | 0 | 0 | ... | 1 | FALSE | FALSE | 0 | 0 |
| B | Apr 3 10:10 | B-1 | -1 | 0 | 0 | | 0 | FALSE | FALSE | 0 | 0 |
| B | Apr 3 10:12 | B-2 | +1 | 0 | 0 | | 1 | FALSE | TRUE | 0 | 0 |
| B | Apr 3 10:14 | B-2 | -1 | 0 | 0 | | 1 | TRUE | FALSE | 0 | 0 |
| B | Apr 3 20:44 | B-3 | +1 | 0 | 1 | | 1 | TRUE | TRUE | 0 | 0 |
| B | Apr 3 20:44 | B-3 | -1 | 1 | 0 | | 1 | TRUE | TRUE | 0 | 0 |
| B | Apr 4 11:05 | B-4 | +1 | 1 | 1 | | 1 | TRUE | TRUE | 0 | 1 |
| B | Apr 4 11:05 | B-4 | -1 | 1 | 1 | | 1 | TRUE | TRUE | 1 | 0 |
| B | Apr 4 17:43 | B-5 | +1 | 1 | 1 | | 1 | TRUE | FALSE | 1 | 1 |
| B | Apr 4 17:43 | B-5 | -1 | 1 | 1 | | 1 | FALSE | TRUE | 1 | 1 |
| B | Apr 4 21:14 | B-6 | +1 | 1 | 1 | | 1 | FALSE | FALSE | 1 | 2 |
| B | Apr 4 21:14 | B-6 | -1 | 1 | 1 | | 1 | FALSE | FALSE | 2 | 1 |

FIG. 9

| Shop ID | Transition Time Stamp | Index | Net Change | Previous Repeat Customer Purchases State | Current Repeat Customer Purchases State | Previous Purchases on Mobile App State | Current Purchases on Mobile App State | Previous Blog Activation State | Current Blog Activation State | Previous Homepage Visits State | Current Homepage Visits State |
|---|---|---|---|---|---|---|---|---|---|---|---|
| B | Apr 3 10:12 | B-2 | +1 | 0 | 0 | ... | 1 | FALSE | TRUE | 0 | 0 |
| B | Apr 3 20:44 | B-3 | +1 | 0 | 1 | 1 | 1 | TRUE | TRUE | 0 | 0 |
| B | Apr 3 20:44 | B-3 | -1 | 1 | 0 | 1 | 1 | TRUE | TRUE | 0 | 0 |
| B | Apr 4 11:05 | B-4 | +1 | 1 | 1 | 1 | 1 | TRUE | TRUE | 0 | 1 |
| B | Apr 4 11:05 | B-4 | -1 | 1 | 1 | 1 | 1 | TRUE | TRUE | 1 | 0 |
| B | Apr 4 17:43 | B-5 | -1 | 1 | 1 | 1 | 1 | FALSE | TRUE | 1 | 1 |

What information would you like to retrieve from the dataset?

Query type:      > ≥ = ≤ <:    Amount:

| How many shops ▼ | had | ≥ ▼ | 3 |

Event type(s):

| Repeat customer purchases ▲ |
| ☑ Repeat customer purchases |
| ☐ Purchases on mobile app |
| ☐ Blog activation / deactivation | within the time period:

| April 3, 2021 - 00:00 | to | April 4, 2021 - 23:59 |

| E-Commerce Platform | Search | JG John's Apparel / Jonny B. Good |
|---|---|---|

| | All channels ⌄ | Today ⌄ |
|---|---|---|

⌂ Home
⤵ Orders
◇ Products
○○ Customers
⫞ Reports
⊛ Discounts
⊞ Apps

SALES CHANNELS ⊕
🏠 Online Store
▭ Mobile App
View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

TOTAL SALES
$98.00
$125
$75
$25
                                                    Jun 1
                                                    2 orders
12am    8pm    4pm    11pm

TOTAL SALES BY CHANNEL   View dashboard
Online Store                                Jun 1
$0.00                                       0 orders Mobile app
$0.00                                       0 orders Shopify POS (126 York St.)
$0.00                                       0 orders

DATA STRUCTURES AND METHODS FOR ELECTRONICALLY RECORDING EVENTS

FIELD

The present application relates to electronically recording events, and, more particularly, to electronically recording events in data structures for possibly improved query results.

BACKGROUND

A record of events may be stored in memory. The events may relate to the operation of a computing platform. There may be a wide variety of different events recorded. For example, in the context of e-commerce, a database may store events related to the online stores of merchants, and examples of events may include: a user arrives at a particular webpage of an online store; a user leaves that webpage; a user adds or removes an item from an online cart; an online store realizes a return customer; an online store or a merchant account activates a particular feature; a merchant logs into his/her merchant account using a mobile application; a customer purchases a product using a mobile application; a merchant adds a blog page to their online store; etc.

As is clear from the examples above, the variety and instances of events that may be recorded can be very large, resulting in a large volume of data that can quickly become unwieldy.

It may be desired to query that data to retrieve certain segments of the data that provide information of interest. For example, in the e-commerce example introduced above, it may be desired to query the data to answer questions such as: "How many online stores had 100 repeat customer purchases in the month of February?", or "What was the net change in the number of online stores having a blog page at the end of the weekend of April 3rd/4th compared to the start of the weekend of April 3rd/4th?"; etc.

SUMMARY

A record of events may be large in volume and subject to a variety of different data queries. Additionally, those queries may originate from different users. One or more of the following technical problems may arise. The data might not be structured in a manner conducive to querying for certain segments of that data, e.g. in the e-commerce example above the way the record of events is structured in the memory might not be conducive to easily answering the query: "What was the net change in the number of online stores having a blog page at the end of the weekend of April 3rd/4th compared to the start of the weekend of April 3rd/4th?". The result may be the generation/execution of a complex query to extract information of interest. Moreover, two different analysts may approach the programming of a same query differently, which may result in two different segments of data (and hence two different answers) being returned for the same question trying to be answered by the query.

Two different analysts may also interpret a query differently. For instance, a merchant may add a blog page to their online store, resulting in a blog webpage activation event. A web application used by the merchant to add the blog page might log the creation of the blog page, which may start in a "draft" state. A first analyst might seek out to measure merchant engagement with the blogging feature of the web application, and consider the creation of the draft blog page to be an activation of a blog webpage feature. A second analyst may seek to measure an amount of content made available to the public via the merchants, and might not consider a draft blog page to be an activation of a blog webpage feature.

Additionally, in some instances, the logic of the query may need to be modified over time to accommodate the addition of different data points, e.g. to accommodate the recording of more or different events (e.g. interleaved in between the original types of events that were recorded), or more or different dates. Windows of time may need to be consistent with one another. For instance, if the count for time window A is X, and the count for time window B is Y, the count for a combined time window of windows A and B must be equal to X+Y, providing that windows A and B are mutually exclusive (e.g. window A may be the month of April and window B may be month of May).

Additionally, in some instances, the data might not be structured in a way that makes it simple to generate/execute a query that inquiries about a net change in a state or balance of an attribute over time, where an attribute is an item of information that can change for an entity (e.g. for an online store). An event may be a transition of an attribute from one state to another state (e.g. blog activation status is an attribute, and the blog activation status changing from the state of "False—Deactivated" to "True—Activated" for an online store is an event).

Additionally, recording data in computer memory is sometimes subject to errors, and there might not be an easy way to discover if an error occurred when the computer generated or modified the data structure.

To try to mitigate at least one of the technical problems above, in some embodiments data related to events is assembled into a data structure having a format logically equivalent to a double entry transition table. Each event may be considered a transition from one state to another state, e.g. for a given attribute of an entity. The occurrence of each event is recorded twice: a first entry representing the actual event as a transition from a previous state to a current state, and a second entry representing a reverse of the first entry. The second entry records a state transition in the reverse direction compared to the first entry.

In an embodiment, there is provided a system. The system includes at least one processor to configure data into a data structure stored in computer memory. The data may represent information associated with a plurality of events. The data structure may include, for each event of the plurality of events, a first entry and a second entry. The first entry may record an occurrence of the event as a transition from a first state prior to the event to a second state subsequent to the event. The second entry may record the occurrence of a same event as the event recorded in the first entry, the same event recorded in the second entry as a reverse transition from the second state back to the first state.

In some embodiments, the first entry may include a first value indicative of a direction of the transition from the first state to the second state, and the second entry may include a second value indicative of an opposite direction of the reverse transition from the second state to the first state.

In some embodiments, the first value may be a first signed numerical value and the second value may be a second signed numerical value having an opposite sign and an equal magnitude to the first signed numerical value.

In some embodiments, the data structure may include a plurality of rows and a plurality of columns. Each pair of rows of the plurality of rows may represent one event. The plurality of columns may include pairs of columns in which each pair of the pairs of columns represents a change in state of a corresponding attribute in response to an event associated with the corresponding attribute. The plurality of columns may also include a net change column having a plurality of cells, in which each cell of the plurality of cells is in a respective different one of the plurality of rows. In some embodiments, each cell in the net change column may have a value indicative of a direction of change in the state of the corresponding attribute in response to the event associated with the corresponding attribute.

In some embodiments, a first row of a pair of the rows may include the first entry, and a first cell intersecting the first row and the net change column may have a first value indicative of a direction of the transition from the first state to the second state. A second row of the pair of the rows may include the second entry, and a second cell intersecting the second row and the net change column may have a second value indicative of an opposite direction of the reverse transition from the second state to the first state.

In some embodiments, the first value may be a first signed numerical value and the second value may be a second signed numerical value having an opposite sign and an equal magnitude to the first signed numerical value.

In some embodiments, addition of all of the cells in the net change column may result in a sum of zero.

In some embodiments, the data structure for each event of the plurality of events may further include at least one of: a timestamp indicating a time at which the event occurred; or, a unique identifier assigned to the event.

A computer-implemented method is also provided. The method may include a step of obtaining data related to a plurality of events. The method may also include a step of configuring the data into a data structure stored in computer memory. The data structure may include, for each event of the plurality of events, a first entry and a second entry. The first entry may record an occurrence of the event as a transition from a first state prior to the event to a second state subsequent to the event. The second entry may record the occurrence of a same event as the event recorded in the first entry, the same event recorded in the second entry as a reverse transition from the second state back to the first state.

In some embodiments, the first entry may include a first value indicative of a direction of the transition from the first state to the second state, and the second entry may include a second value indicative of an opposite direction of the reverse transition from the second state to the first state.

In some embodiments, the first value may be a first signed numerical value and the second value may be a second signed numerical value having an opposite sign and an equal magnitude to the first signed numerical value.

In some embodiments, the step of configuring the data into the data structure may include configuring the data structure to include: a plurality of rows, each pair of rows represents one event; and a plurality of columns. The plurality of columns may include pairs of columns in which each pair of the pairs of columns represents a change in state of a corresponding attribute in response to an event associated with the corresponding attribute. The plurality of columns may also include a net change column having a plurality of cells, in which each cell of the plurality of cells is in a respective different one of the plurality of rows. In some embodiments, each cell in the net change column may have a value indicative of a direction of change in the state of the corresponding attribute in response to the event associated with the corresponding attribute.

In some embodiments, the first row of a pair of the rows may include the first entry, and a first cell intersecting the first row and the net change column may have a first value indicative of a direction of the transition from the first state to the second state. A second row of the pair of the rows may include the second entry, and a second cell intersecting the second row and the net change column may have a second value indicative of a direction of the reverse transition from the second state to the first state.

In some embodiments, the first value may be a first signed numerical value and the second value may be a second signed numerical value having an opposite sign and an equal magnitude to the first signed numerical value.

In some embodiments, the method may further include adding all of the cells in the net change column to result in a sum of zero.

In some embodiments, the method may further include executing a query to retrieve specific information requested by a user. The executing may include filtering out first entries and second entries in the data structure that are not associated with the events related to the specific information requested by the user and summing the first signed numerical values of remaining first entries and the second signed numerical values of remaining second entries. A sum may be indicative of the specific information requested by the user. In some embodiments, the method may further include transmitting instructions for displaying an output including the specific information requested by the user.

In some embodiments, the query may be directed to determining a net change of an attribute over a duration of time.

In some embodiments, the data structure for each event of the plurality of events may further include at least one of: a timestamp indicating a time at which the respective event occurred; or, a unique identifier assigned to the event.

In another embodiment, there is provided a computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIGS. 2 to 4 illustrate examples of events recorded in relation to online stores, according to some embodiments;

FIG. 5 illustrates an example of a double entry transition table data structure, according to one embodiment;

FIGS. 6 to 8 illustrate examples of retrieving data relating to a query from the double entry transition table data structure of FIG. 5, according to some embodiments;

FIG. 9 illustrates an example of a double entry transition table data structure having an additional attribute, according to one embodiment;

FIG. 10 illustrates an example of retrieving data relating to a query from the double entry transition table data structure of FIG. 9, according to one embodiment;

FIG. 11 illustrates an example of a user interface for entering queries to retrieve data from a double entry transition table data structure, according to one embodiment;

FIG. 14 illustrates a home page of an administrator, according to one embodiment.

DETAILED DESCRIPTION

For illustrative purposes, specific example embodiments will now be explained in greater detail below in conjunction with the figures.

Example System for Querying Recorded Event Data

It may be desirable for an analyst to query recorded event data in order to retrieve a specific piece of information, e.g. in order to analyze metrics of interest for a group of data, such as data relating to a group of online stores. However, data may be stored in a manner that might make it difficult to retrieve the specific piece of information. As well, data may be stored in a manner in which the structure of a query for each specific piece of information might need to be crafted differently.

In some embodiments, the data may be configured into a data structure having a format equivalent to a double entry transition table. The double entry transition table may allow for an analyst to retrieve desired information possibly more simply and consistently, e.g. possibly without requiring modification of query logic when additional data is added to the dataset.

Figure 1:
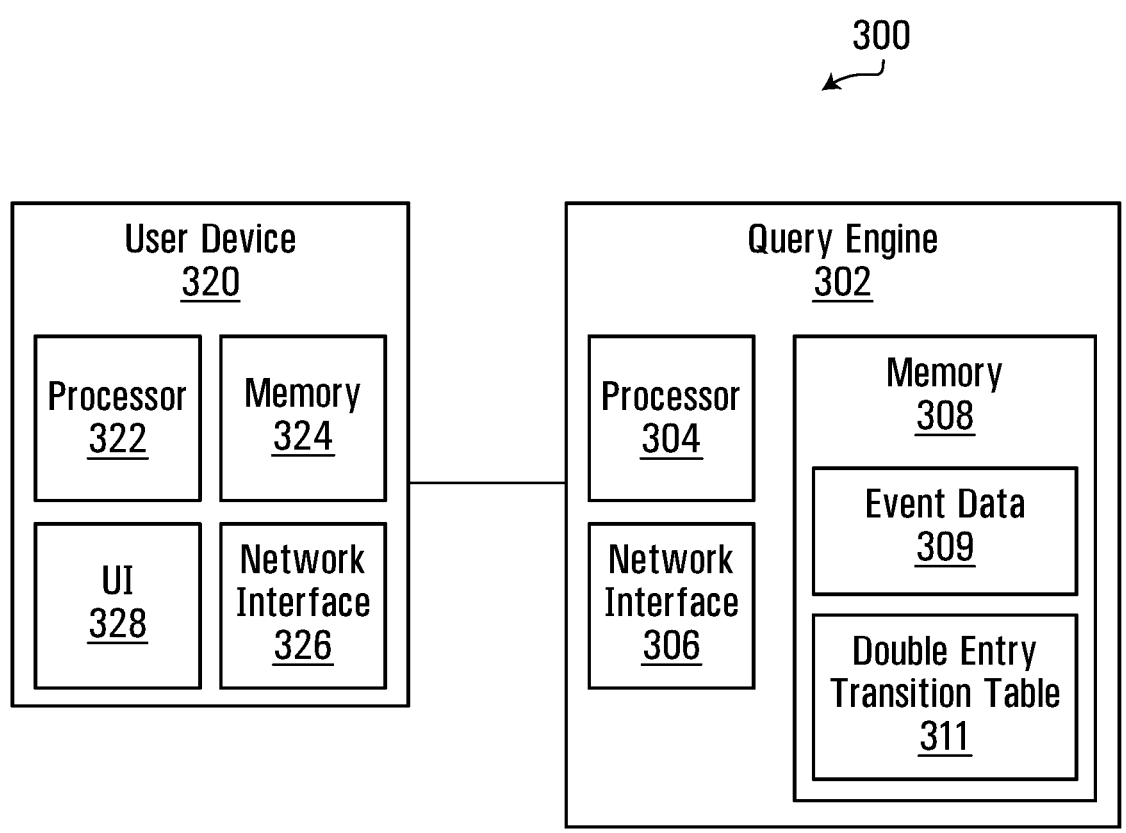
FIG. 1 illustrates a system for configuring a data structure and executing queries, according to one embodiment.

FIG. 1 illustrates a system 300 for configuring a data structure and executing queries, according to one embodiment. The system 300 includes a query engine 302 and at least one user device 320. While there may be many user devices, only a single user device 320 is illustrated.

The query engine 302 includes a processor 304 and a network interface 306. The processor 304 directly performs, or instructs the query engine 302 to perform, the operations described herein of the query engine 302, e.g., operations such as obtaining event data 309, configuring a double entry transition table 311, etc. The processor 304 may be implemented by one or more general purpose processors that execute instructions stored in a memory (e.g. in memory 308) or stored in another computer-readable medium. The instructions, when executed, cause the processor 304 to directly perform, or instruct the query engine 302 to perform the operations described herein. In other embodiments, the processor 304 may be implemented using dedicated circuitry, such as a programmed field programmable gate array (FPGA), a graphics processing unit (GPU), or an application specific integrated circuit (ASIC).

The network interface 306 is for communicating over a network, e.g. to communicate with the user device 320. The network interface 306 may be implemented as a network interface card (NIC), and/or a computer port (e.g. a physical outlet to which a plug or cable connects), and/or a network socket, etc., depending upon the implementation.

The query engine 302 further includes a memory 308. A single memory 308 is illustrated in FIG. 1, but in implementation the memory 308 may be distributed. The memory 308 may include event data 309 and the double entry transition table 311, which will be described in more detail later.

In some embodiments, the query engine 302 may be implemented inside of an e-commerce platform. In some embodiments, the processor 304, memory 308, and/or network interface 306 may be located outside of the query engine 302.

A plurality of analysts may communicate with (e.g. access) the query engine 302 over a network using user devices. For example, an analyst may use the user device 320 to input a query for specific information relating to recorded events. The user device 320 may be a mobile device (e.g. a smartphone, laptop, tablet), a desktop computer, etc., depending upon the implementation. The user device 320 includes a processor 322, a memory 324, a user interface 328, and a network interface 326. The processor 322 directly performs, or instructs the user device 320 to perform, the operations of the user device 320 described herein, e.g. enabling an analyst to enter, via the use of user interface 328, queries to retrieve specific information relating to a plurality of events. The processor 322 may be implemented by one or more general purpose processors that execute instructions stored in a memory (e.g. memory 324) or stored in another computer-readable medium. The instructions, when executed, cause the processor 322 to directly perform, or instruct the user device 320 to perform, the operations described herein. In other embodiments, the processor 322 may be implemented using dedicated circuitry, such as a programmed FPGA, a GPU, or an ASIC.

The user interface 328 may be implemented as a display screen (which may be a touch screen), and/or a keyboard, and/or a mouse, etc., depending upon the implementation. The network interface 326 is for communicating with the query engine 302 over the network. The structure of the network interface 326 will depend on how the user device 320 interfaces with the network. For example, if the user device 320 is a mobile phone, laptop, or tablet, the network interface 326 may comprise a transmitter/receiver with an antenna to send and receive wireless transmissions to/from the network. If the user device 320 is a personal computer connected to the network with a network cable, the network interface 326 may comprise a NIC, and/or a computer port (e.g. a physical outlet to which a plug or cable connects), and/or a network socket, etc.

In some embodiments, the query engine 302 is part of an e-commerce platform, e.g. e-commerce platform 100 described later. However, this is not necessary. In the context of e-commerce, the query engine 302 may, for example, instead be implemented as a stand-alone component or service that is external to an e-commerce platform. More generally, the query engine 302 might have no association with e-commerce. The event data 309 could relate to any types of events that might occur, with no association to commerce or e-commerce being necessary. For example, the event data 309 might relate to operation of a computing platform or network in a computing application having no relation to the sale of goods and services. Simply for sake of example, embodiments in the context of e-commerce are mostly described herein.

In some embodiments, the query engine 302 may be provided in the form of a downloadable application that is available for installation. In some embodiments, some operations of the query engine 302 described herein could potentially be implemented in part on/by user device 320.

Operation will be described in the context of a simplified example. In the example, events are recorded in relation to operation of an e-commerce platform, such as the e-commerce platform 100 described later herein. There may be a wide variety of different events recorded, e.g. the occurrence of almost any activity on the e-commerce platform may be the subject of a recorded event. For example, an event may be a user arriving on a particular webpage, a product being added to an online cart, the sale of product, the activation of a particular feature or webpage by a merchant, etc.

In the example, it is assumed that three different types of events are tracked for each online store on the e-commerce platform: (1) A return customer makes a purchase on an online store; (2) A purchase is made on an online store by a customer using a mobile application; and (3) A blog webpage is activated (e.g. included on) or deactivated (e.g. removed from) an online store.

Only three online stores will be considered: Shop A, Shop B, and Shop C. Also, for simplicity, only the occurrence of these events over a period of two days will be considered: the weekend of April 3rd/4th. The shops are examples of entities and may each be uniquely identified by a shop ID.

FIGS. 2 to 4 illustrate examples of the events recorded in relation to Shop A, Shop B, and Shop C, according to some embodiments.

FIG. 2 illustrates an example of events recorded in relation to Shop A. Tables 2A to 2C illustrate examples of recorded events that may be part of the event data 309 stored in the memory 308 of the query engine 302.

On the weekend of April 3rd/4th, whenever a customer completed a checkout to purchase a product on the online store of Shop A, if that customer was a repeat customer of Shop A, then the event "repeat customer purchase" has occurred. The tally of total number of repeat customer purchases increases by one for each occurrence of the event.

Table 2A of FIG. 2 represents data that is extracted from the "repeat customer purchase" events. In this example, the data includes a timestamp at which the event occurred (e.g. corresponding to the time at which the purchase transaction completed), an index assigned to uniquely identify the event (e.g. to distinguish it from other events of the exact same type, for the exact same entity, that occurred at the exact same time), and the new tally of the total number of repeat customer purchases. For example, row 402 of Table 2A shows that the first instance of a repeat customer purchase occurred at 09:34 on Saturday April 3rd. The entry is assigned index number A-1. As another example, row 404 of Table 2A shows that the second instance of a repeat customer purchase occurred at 17:25 on Saturday April 3rd. The entry is assigned index number A-3. The index numbers are included to assist with the explanation and might not be stored in relation to multiple occurrences of the same event if the time stamp acts as a unique identifier. For example, the index numbers A-1, A-3, and A-6 may be omitted from Table 2A. Also, in the example the index numbers are assigned a value based on the order in time the event occurred compared to other events in the same online store, which is why, for example, row 404 is assigned A-3 and not A-2, because A-2 represents another event occurring after A-1 but before A-3. The column "repeat customer purchases" may be considered an attribute that changes state (e.g. from the state "one repeat customer" to the state "two repeat customers") by the occurrence of an event, where the event in the example of Table 2A is occurrence of a repeat customer for Shop A.

Table 2B of FIG. 2 represents the data that is extracted from the "purchase on mobile application" events. Each time a purchase was made on the online store of Shop A on the weekend of April 3rd/4th, and that purchase was made by a customer using a mobile application, an instance of the event occurs. For example, row 406 of Table 2B shows that the first instance of a purchase on a mobile application occurred at 10:10 on Saturday April 3rd. The entry is assigned index A-2.

Table 2C represents the data that is extracted from the "activate or deactivate a blog webpage" events. On the weekend of April 3rd/4th, any time a merchant activated a blog webpage on the online store of Shop A (e.g. created a blog page on the online store or posted or linked a blog page to the online store), an instance of an activation event occurred. Any time a merchant deactivated a blog webpage on the online store of Shop A (e.g. removed the blog page), an instance of a deactivation event occurred. As shown in Table 2C, at the start of the weekend of April 3rd/4th (time 00:00 on April 3rd) there was no blog page activated, i.e. activation=FALSE, but the merchant activated a blog page at 20:15 on Saturday April 3rd.

In some implementations, the state, activation=FALSE, at the start of the weekend of April 3rd/4th may considered to be the default value of the state for the "Blog Activation" attribute. This default value may be predetermined by an analyst prior to recording data for a particular embodiment.

In another implementation, the state, activation=FALSE, at the start of the weekend of April 3rd/4th may be determined based on data recorded and stored in a memory prior to the tracking window of interest. For instance, data relating to the activation state of the blog page for Shop A may have been recorded for the time period of March 29 to April 2, and the last recorded data may indicate that a blog webpage was not active at 23:59 on April 2.

As shown in Table 2A, there were a total of three repeat customer purchases over the time period. As shown in Table 2B, there were a total of four purchases made using a mobile application over the time period. As shown in Table 2C, the merchant activated a blog webpage during the time period.

In Tables 2A, 2B, and 2C, an index is assigned to uniquely identify each event, however this is not required. In some implementations, each event may be uniquely identifiable using the data recorded in a combination of the columns representing the event, such as the shop ID, transition time stamp, the net change in the state of an attribute, and/or the index. In some implementations, the value recorded in the index column of a table including event data may be globally unique with respect to all other index values assigned to all other events. Alternatively, the value recorded in the index column of a table including event data may be recycled for each shop ID/timestamp/net change in the state of an attribute tuple.

In some embodiments, additional types of events may be tracked. At least one of these types of events might include the change in state of a multivalued attribute, and the value of a multivalued attribute may be stored as a text string. As an example, an event indicating a change in a subscription tier level in an online store on the e-commerce platform may be tracked. The states of this attribute may be "gold", "silver", and "bronze".

FIG. 3 illustrates the data extracted from the same type of events that occurred for the online store of Shop B during the weekend of April 3rd/4th. Tables 3A to 3C may be stored as part of the event data 309 stored in the memory 308 of the query engine 302. As shown in Table 3A, there was only one repeat customer purchase during the time period. As shown in Table 3B, there was only one purchase made using a mobile application over the time period. As shown in Table 3C, the merchant activated a blog webpage but then subsequently deactivated the blog webpage during the time period.

FIG. 4 illustrates the data extracted from the same type of events that occurred for the online store of Shop C during the weekend of April 3rd/4th. Tables 4A to 4C may be stored as part of the event data 309 stored in the memory 308 of the query engine 302. As shown in Table 4A, there were a total of three repeat customer purchases over the time period. As shown in Table 4B, there were a total of three purchases made using a mobile application over the time period. As shown in Table 4C, the merchant deactivated a blog webpage during the time period.

In FIGS. 2 to 4, the event data 309 is shown in the form of tables, however, this is only one example of a form in which data may be stored in the memory 308. The formatting of the event data 309 is not limited to the manner illustrated in FIGS. 2 to 4.

In some embodiments, the event data shown in FIGS. 2 to 4 may instead be organized in tables based on the event type instead of the shop to which the event data relates. For instance, the data in Tables 2A, 3A, and 4A may be stored in a single table including all data relating to "Repeat Customer Purchases" events. Similarly, the data in Tables 2B, 3B, and 4B may be stored in a single table, as may the data in Tables 2C, 3C, and 4C, relating to data for "Purchases on a Mobile App" and "Blog Activation" data, respectively. In some embodiments, all of the tables in FIGS. 2 to 4 may be stored as one table.

FIG. 5 illustrates the recorded event data in FIGS. 2 to 4 assembled into a double entry transition table structure, according to one embodiment. The assembling may consist of moving the data from the tables in FIGS. 2 to 4 into a data structure (e.g. table) in memory where each event from the tables in FIGS. 2 to 4 is represented by a double entry (e.g. a pair of rows) in the data structure. The attributes are included, along with an indication of whether a change of state has occurred, e.g. as illustrated in FIG. 5. The double entry transition table structure shown in FIG. 5 may be an example of the double entry transition table 311 stored in the memory 308 of the query engine 302. In FIG. 5, the events related to each of online store Shop A, Shop B, and Shop C have been time-ordered with all events for a same online store grouped together in a set of adjacent rows.

In actual implementation, the events may be stored in a different order, e.g. in time-order independent of the online store. The rows are labelled 1 to 38 to assist with the explanation. An intersection of a row and a column (storing one unit of information in the table) is referred to as a "table cell" or "cell".

In the double entry transition table 311, an event is recorded as a change from one state to another state. For example, each online store begins the April 3rd/4th weekend having the state of "zero return customer purchases". When the first return customer purchase occurs on the online store, the state transitions to "one return customer purchase". Each item of information that can change from one state to another is referred to as an attribute. For example, "number of repeat customer purchases" is an attribute that changes from a previous state (e.g. zero repeat customer purchases) to a current state (e.g. one repeat customer purchase) in response to occurrence of an event of "instance of a repeat customer purchase". For example, row 1 of the table of FIG. 5 indicates that for Shop A there is a transition from a state of zero repeat customer purchases to one repeat customer purchase. The transition occurs at 09:34 on Saturday, April 3rd, representing the event recorded in row 402 of Table 2A of FIG. 2. In row 1 of the table of FIG. 5, the column "Previous Repeat Customer Purchase State" is populated with the entry "0", and the column "Current Repeat Customer Purchase State" is populated with the entry "1", representing the transition from zero repeat customer purchases to one repeat customer purchase.

As the double entry transition table 311 in FIG. 5 is derived from the data found in the tables in FIGS. 2 to 4, the initial values used to populate the previous and current state columns for each attribute may be based on "default values" that may be particular to each attribute. The default value may be based on the last known state of the attribute prior to a time window of interest. The default value may also or instead be based on the first piece of data extracted relating to an attribute. For example, in row 1 of double entry transition table 311, the column "Previous Repeat Customer Purchase State" is populated with the entry "0". As the first entry in Table 2A relating to the "Repeat Customer Purchases" attribute for Shop A is the recording of 1 repeat customer purchase, it may be assumed that the previous value of this column is 0 at the start of the time window of interest. Subsequently, this informs the default value of the "Previous Repeat Customer Purchase State" at the beginning of the time window of interest.

Row 25 is indicative of the first change of state of one of the attributes having regard to Shop C, and rows 25 to 38 are derived from the information in Tables 4A to 4C. As Table 4C indicates that the blog activation state of Shop C has a value of "True" at the start of the time window of interest, "True" is used as the default state of this attribute for the first entry relating to Shop C in the double entry transition table 311, and this is used to populate the column "Previous Blog Activation State" in row 25.

Each attribute has its own respective pair of columns representing the transition of a corresponding state based on occurrence of an event. For example, the columns "Previous Purchases on Mobile App State" and "Current Purchases on Mobile App State" record an event of a purchase on a mobile application as a transition from one state to a new state. For example, row 3 of the table of FIG. 5 indicates that for Shop A, there is a transition from a state of zero purchases on a mobile application to one purchase on a mobile application. The transition occurs at 10:10 on Saturday, April 3rd. It represents the event recorded in row 406 of Table 2B of FIG. 2, i.e. the first occurrence of a purchase on a mobile application. In row 3 of the table of FIG. 5, the column "Previous Purchases on a Mobile App state" is populated with the entry "0", and the column "Current Purchases on a Mobile App state" is populated with the entry "1", representing the transition from zero purchases on a mobile application to one purchase on a mobile application.

Similarly, the columns "Previous Blog Activation State" and "Current Blog Activation State" record an event of activating or deactivating a blog as a transition from one state to a new state. For example, row 9 of the table of FIG. 5 represents the event of a blog being activated for Shop A, which is the event recorded in Table 2C of FIG. 2. In row 9 of the table of FIG. 5, the column "Previous Blog Activation State" is populated with the entry "FALSE", and the column "Current Blog Activation State" is populated with the entry "TRUE", representing the transition from having no blog webpage to having a blog webpage.

In some embodiments, the same activity might result in the recording of two or more events. For example, a repeat customer might purchase a product using a mobile application, as is the case for the events captured in rows 5 and 7 of the table in FIG. 5. As a result, a unique index may be stored in relation to each event in some examples where the time stamp might not act as a unique distinguishing index if the same activity results in multiple events, as is the case in rows 5 and 7.

When an event is recorded in the table of FIG. 5, the columns not impacted do not change value. For example, row 1 represents the transition from zero repeat customer purchases to one repeat customer purchase for Shop A. There is no change in the state values in relation to purchases on a mobile application or blog activation/deactivation.

In contrast to the conventional practice of trying to minimize memory resources, in FIG. 5, each event is recorded twice: (1) a recording of the actual event as a transition from the previous state to the current state, and (2) a recording of a hypothetical subsequent reversal of that same event, representing a transition back to the state before the actual event occurred. A parallel may be drawn to double-entry accounting in which each transaction (i.e. an event) in one account has an equal and opposite effect in another account, e.g. a debit in one account offsets a credit in another account. However, in the context of FIG. 5 there are not literally accounts. There is a recording of a double entry for each event: a first entry representing a state transition in one direction, and a second entry representing a state transition in the opposite direction that offsets the first entry.

For example, the event of transitioning from zero repeat customer purchases to one repeat customer purchase is represented by index A-1 in FIG. 5, and it consists of two recorded entries in the double entry transition table 311 stored in the memory 308. The first entry is recorded in row 1 of the table and represents the actual event data captured in row 402 of Table 2A of FIG. 2, i.e. at Apr 3rd at 09:34, there is an event of a repeat customer purchase, such that the state of repeat customer purchases transitions from zero repeat customer purchases to one repeat customer purchase. The second entry is recorded in row 2 of the table of FIG. 5 and represents the reversal of the same event, as if hypothetically one could go backwards and remove a repeat customer purchase. In row 2, the previous state of one repeat customer purchase transitions back to a current state of zero repeat customer purchases.

It is noted that a "real world" meaning does not necessarily have to be associated with the second entry. The purpose of the second entry is to assemble a data structure having a format in which queries can be executed by the query engine 302 in a possibly faster and more standardized manner, with the additional side benefit in that it may help in identifying errors in the recording of the events, as explained in more detail below.

A column "Net Change" is included in the double entry transition table 311 of FIG. 5. For each recorded event, the first entry (i.e. the data representing the actual event and recorded in the odd-numbered row) may be assigned a net change of "+1". The second entry representing the hypothetical reversal of the first entry may subsequently be assigned the net change of "−1". For example, row 1 of the table in FIG. 5 represents the transition from zero repeat customer purchases to one repeat customer purchase and hence the net change of "+1" is assigned. Row 2 of the table in FIG. 5 represents the reverse transition from one repeat customer purchase back to zero repeat customer purchases and hence the net change of "−1" is assigned.

In some embodiments, data relating to particular events may include a change in a quantity different from +/−1. Consequently, in some embodiments a "Quantity" column (not illustrated) may be included as part of the double entry transition table 311 stored in the memory 308 of the query engine 302. In such embodiments, the value of the "Net Change" column for a first entry of a recorded particular event may be assigned a net change value that corresponds to +1*("Quantity"). Accordingly, the value of the "Net Change" column for a second entry of the recorded particular event may be assigned a net change value that corresponds to −1*("Quantity"), which is representative of the hypothetical reverse transaction. In other embodiments, there might not be a separate "Quantity" column, but the "Net Change" column may store values greater than one, e.g. +4 for a first entry and −4 for a second entry representing the hypothetical reversal of the first entry. In any case, any positive and negative values herein may actually be stored in binary form, not integer form as illustrated.

In some implementations, there might not literally be a table in actual implementation, but an equivalent logical structure.

Also, or instead, in some implementations the double entry transition table 311 stored in FIG. 5 might not be "materialized" (i.e. stored, either permanently or temporarily in the memory 308), but might instead be generated by the query engine 302 as needed during execution of a query.

The double entry transition table 311 in FIG. 5 results in a data structure having a format in which queries can be executed in a possibly faster and more standardized manner to retrieve certain segments of the data. Examples of retrieving data relating to a query from the double entry transition table data structure of FIG. 5 are shown in FIGS. 6 to 8, according to some embodiments.

For example, the following query may be executed by the processor 304 of the query engine 302: "What was the net change in the number of online stores having a blog page at the end of the weekend of April 3rd/4th compared to the start of the weekend of April 3rd/4th?". Execution of the query may proceed as follows, and is illustrated in FIG. 6:

Step 1: Each row of the double entry transition table 311 of FIG. 5 having a "Current Blog Activation State=TRUE" is selected to select instances of an activation of a blog webpage. This is shown in FIG. 6 by hatching out the rows of FIG. 5 that are not needed to retrieve the information requested by the query. The hatching illustrates the action of filtering out the rows not selected, i.e. the rows where the "Current Blog Activation State=FALSE".

Step 2: For the selected rows (not hatched out in FIG. 6), the "Net Change" column is then summed.

The result of the summation in step 2 is the net change in the number of online stores having a blog page at the end of the weekend of April 3rd/4th compared to the start of the weekend of April 3rd/4th. The result is zero, as during that weekend Shop A activated a blog (row 9 of FIG. 6) but Shop C deactivated a blog (row 30 of FIG. 6). Shop B activated and then subsequently deactivated a blog before the end of the weekend (rows 19 and 24 of FIG. 6). For the selected rows corresponding to events that are not related to blog activation or deactivation, the value in the "Net Change" column is always zero. For example, rows 11 and 12 of FIG. 6 represent an event related to a repeat customer purchase, and so there is no net change in blog activation in these rows because the value of "+1" in row 11 is offset by the value of "−1" in row 12. This is an example of how tracking new attributes/events in the future (i.e. adding new interleaved rows in this table, and new attribute columns) will not affect any of the counts for those queries that only considered the prior set of attributes.

Another example of a query that might be executed by the processor 304 of the query engine 302 is: "How many online stores had three or more repeat customer purchases by the end of the weekend of April 3rd and April 4th?". The execution of this query is shown in FIG. 7, and may proceed as follows:

Step 1: Each row of the double entry transition table 311 of FIG. 5 having a "Current Repeat Customer Purchases State≥3" is selected to select instances of at least three repeat customer purchases. This is shown in FIG. 7 by hatching out rows that are not required to retrieve the information requested by the query. The hatching illustrates the action of filtering out the rows not selected.

Step 2: For the selected rows (not hatched out in FIG. 7), the "Net Change" column is then summed.

The result of the summation in step 2 is the number of online stores having three or more repeat customer purchases by the end of the weekend. The result is two because Shop A had three repeat customer purchases (row 11 of FIG. 7) and Shop C had three repeat customer purchases (row 37 of FIG. 7). The values in rows 13 to 16 cancel themselves out (i.e., have a net change of zero) because they relate to other types of events that have occurred once there were three repeat customers in Shop A.

In some examples, a query may be used to request specific information relating to more than one event type. For instance, a query that might be executed by the processor 304 of the query engine 302 may be: "How many shops have had at least two repeat customer purchases while also having an active blog post during the weekend of April 3rd and April 4th?". The execution of this query may be shown by FIG. 8, and may proceed as follows:

Step 1: Each row of the double entry transition table 311 of FIG. 5 having both a "Current Repeat Customer Purchases State≥2" and a "Current Blog Activation State=TRUE" is selected to select instances of at least two repeat customer purchases and an active blog post. This is shown in FIG. 8 by hatching out rows that are not required to retrieve the information requested by the query. The hatching illustrates the action of filtering out the rows not selected.

Step 2: For the selected rows (not hatched out in FIG. 8), the "Net Change" column is then summed.

The result of the summation in step 2 is the number of online stores having at least two repeat customer purchases and an active blog post during the weekend. The result of the summation is one, as only Shop A has entries that fill both criteria (row 9 of FIG. 8). The values in rows 11 to 16 of FIG. 8 cancel themselves out (i.e., have a net change of zero), because they relate to either the same type of event while still meeting the query criteria (e.g. rows 11 and 12, in which additional repeat customer purchase events are recorded and "Current Repeat Customer Purchases State" is still ≥2) or they relate to other types of events (e.g. rows 13 to 16, which record purchases from the online store on a mobile app).

The two-step query execution followed in the examples above is the same for a query relating to any columns of the double entry transition table 311, and the two-step execution process may be utilized even when additional event data 309 is added.

FIG. 9 illustrates an example of adding new event data to the double entry transition table of FIG. 5, according to an embodiment. The data shown in FIG. 9 is an excerpt of the double entry transition table 311 of FIG. 5 corresponding to the entries relating to Shop B, but includes two additional columns relating to a change in state of a new attribute. For example, FIG. 9 may show the double entry transition table 311 in FIG. 5 that might be modified to capture an event for Shop B of a user visiting a home webpage of Shop B. There might be many instances of such events, but in a simple example, this event may only occur twice during the weekend of April 3rd/4th. In this example, the events are inserted as rows in the double entry transition table based on the time of occurrence, and indices are assigned chronologically. As the first instance of a user visiting a home webpage of Shop B occurred at a time prior to the last event recorded relating to Shop B during the time window of interest (i.e. the event having an index of B-4 in the double entry transition table 411 in FIG. 5), the first instance of a user visiting a home webpage of Shop B is indexed as B-4 in the table of FIG. 9. The event in the table of FIG. 5 that previously held this index has been re-assigned an index of B-5. Since the second instance of a user visiting a home webpage of Shop B occurs at a time later than the other events, this entry is inserted in the table below the event having the index B-5 as a row having the index B-6. This information may be stored as event data 309 in the memory 308 of the query engine 302, and may be integrated into the to the double entry transition table 311 of FIG. 9 through the two additional columns: "Previous Homepage Visits State" and "Current Homepage Visits State".

In other implementations, new indices may be assigned to every new inserted event, regardless of the time at which the event occurred Even with the additional data in the table in FIG. 9, a repeat of the execution of an earlier query operates in the same manner: b y selecting the appropriate rows of the table and summing the values in the "Net Change" column for those rows. For example, the following query may be executed again, but in relation to the double entry transition table 311 of FIG. 9: "What was the net change in the number of online stores having a blog page at the end of the weekend of April 3rd/4th compared to the start of the weekend of April 3rd/4th?". In executing the query, the additional rows relating to a user visiting a home webpage of Shop B are either filtered out or add up to a net change of zero, as shown in FIG. 10.

The examples described above assume that events are associated with online stores or online marketplaces, and hence the first column in the table of FIG. 5 is "Shop ID". The shop ID is only one example of an entity identifier used in the double entry transition table 311. In some implementations, the entity identifier may span more than one column of the double entry transition column, and may include, for example, a shop ID and a buyer ID.

Alternatively, or additionally, events may be associated with visitors/customers of the e-commerce platform and/or merchants and/or partners. These are only examples of identifiable entities to whom the event data may be related. In implementation, the data may be related to any uniquely identifiable entity of interest to an analyst.

One technical benefit of some of the embodiments may include the provision of a data structure having a modular structure that allows for a computer to execute certain queries possibly faster and in a more straight-forward manner. The queries may be executed in the same way as more events of interest are added to the event data 309. In some embodiments, a query executor may exist separate from the data structure and prepare queries in response to input, e.g. input at a simplified user interface, as described later in relation to FIG. 11. The input may specify a start timestamp, an end timestamp, and a query in relation to one or more pairs of columns representing attributes relating to events and their desired values.

Another technical benefit of some of the embodiments may include the provision of a data structure that captures transitions of events, which may allow for simpler and/or faster computer execution of queries that segment by transitions. This may better allow for path analysis and/or survival modeling. An example of a "path analysis" query is as follows: "How many shops activated a blog page and then abandoned it (i.e. deactivated it) over the weekend of Apr 3rd/4th?". Referring to the table in FIG. 6, the activation and subsequent deactivation of the blog in Shop B, as indicated by the +1 and −1 in different events (rows 19 and 24 of FIG. 6), reveals that Shop B is a shop that meets the query. An example of a "survival modelling" query is as follows: "If a shop activates a blog webpage, what is the probability that they will deactivate it within 48 hours?" Referring to the table in FIG. 6, the activation and subsequent deactivation of the blog in Shop B, as indicated by the +1 and −1 in different events (rows 19 and 24 of FIG. 5) over the course of 48 hours, reveals that Shop B is a shop in which a blog was activated and deactivated within 48 hours. Comparing the number of shops meeting this criterion to all the other shops in which a blog was activated and not deactivated within 48 hours reveals the probability. Survival modelling (or more broadly, predictive modelling, e.g. Markov modelling) may also be used to predict state transitions for attributes that have more than two states (e.g. mobile platform used: iOS™, Android™, Other).

A further technical benefit of some of the embodiments may include the provision of a data structure that facilitates the identification of errors through a parity check. Upon generating the double entry transition table 311 of FIG. 5, the "Net Change" column may be quickly summed, and the result should be zero. If the result is not zero, it indicates that there has been an error in the construction of the table. The error may result from a computer memory error when writing the data to the table, or an error in the executed code that assembled the table. The result should also be zero when summing across each distinct entity in the table of FIG. 5, i.e., the sum of the "Net Change" column should be zero for all rows involving Shop A, all rows involving Shop B, etc.

Another further technical benefit of some of the embodiments may include the provision of a data structure that facilitates separation of query logic from data, that facilitates counting, and that facilitates segmenting on slices of time.
User Interface for Querying In some embodiments, a query executor tool may exist separate from the data structure and may allow a user to prepare queries quickly and easily through the use of a graphical user interface. The user may be an analyst or someone who is non-technical, e.g. someone who has no training or experience as an analyst. In some implementations, the query executor may enable a user to prepare and request execution of a query without the need for scripting the query. Due to the structure of the double entry transition table 311 of the query engine 302, a partially standardized script may be used as the basis of the query, and the user may be able to simply select the particular information they wish to obtain relating to the recorded data stored in the memory 308.

FIG. 11 illustrates an example of a user interface for entering queries to retrieve data from a double entry transition table data structure, according to one embodiment. The user interface is provided to a user who wishes to execute a query, through the user interface 328 of the user device 320. Through the user device 320, a query executor interface 1100 is provided. The query executor interface 1100 prompts the user to enter data relating to the information they are requesting from the query engine 302 by providing a plurality of fields to form a query. Examples of fields may include: the type of query, the type of event, the quantity of occurrences of the event, and the time period in which the event has occurred.

In the query executor interface 1100 of FIG. 11, there is a prompt asking the user of the user device 320 what information they would like to retrieve from the dataset, followed by a series of fields that may be used to build an appropriate query.

The first field is the "query type". In FIG. 11, the type: "How many shops" has been selected, e.g. from a drop-down list that may appear when selecting the field or hovering over the field using a cursor. Another example of a query type may be: "What was the net change in the number of online stores". In some implementations, the remaining fields may be adaptively provided following the selection of the "query type".

Based on the query type of "How many online stores", fields may be provided for the user to select a comparator and a quantity for the occurrences of an event. For instance, it is shown in the query executor interface 1100 that the user is looking for the number of shops for which greater than or equal to three occurrences of an event have been recorded.

The query executor interface 1100 shown in FIG. 11 allows the user to select one or more event types relating to the information being requested. For example, a drop-down list may be provided to the user, who may select one or more options of event types recorded in the event data 309 by checking one or more of the check boxes. As well, the user is able to select the time period in which to search for the occurrence of events based on timestamp data, including both start and end dates and times. In FIG. 11, the user has selected one event type ("repeat customer purchases"), and the time period as the beginning of the day April 3rd to the end of the day of April 4th.

When a user selects the "GO' button in the query executor interface 1100, the selections of the fields may be provided as indications to the query engine 302. The indications may then be used to fill out a script to generate a query to be executed to provide the specific information requested by the user. In the example shown in FIG. 11, the resultant query may be: "How many shops had 3 repeat customer purchases within the time period of Apr. 3, 2021 at 00:00 to Apr. 4, 2021 at 23:59?" This is equivalent to the example query executed as shown by FIG. 7. Through the use of the processor 304, the query engine 302 may generate and execute the query using the double entry transition table 311.

The query executor interface 1100 of FIG. 11 is only an example of a query executor interface, and the interface is not limited to the format or functionality shown or described by this example. For instance, drop-down lists might not be provided for the user to select an option to populate a field. Instead, a blank text box may be provided for a user to type in the field.

Figure 12:
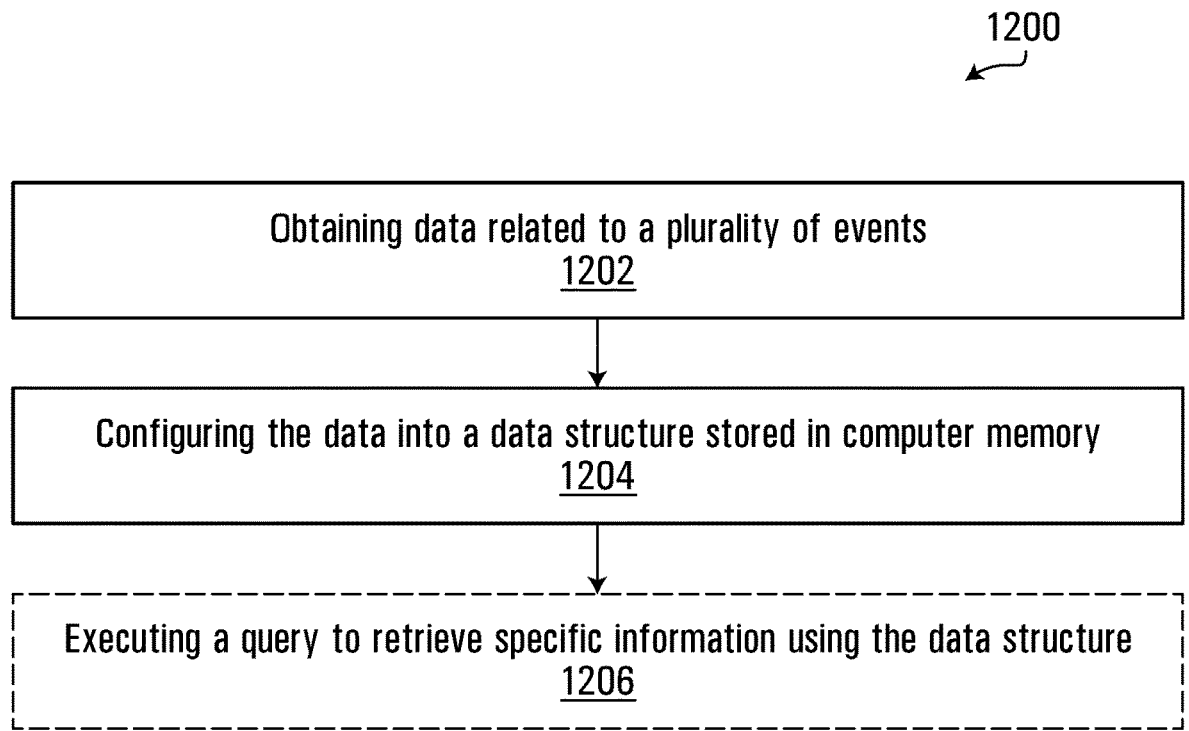
FIG. 12 illustrates steps of a computer-implemented method, according to one embodiment.

In some embodiments, the web content of the query executor interface 1100 may be generated by the query engine 302 and transmitted to the user device 320 for display on the user interface 328 of the user device 320. The selection of the query parameters (provided by user input through the user interface 328) may then be transmitted back to the query engine 302.
Example Methods FIG. 12 illustrates a computer-implemented method 1200, according to one embodiment. Not all of the steps in the method 1200 of FIG. 12 are necessary in all embodiments. Also, some of the steps may be substituted by other steps instead. In method 1200, the steps are described as being performed by the processor 304 of the query engine 302 of FIG. 1, but this is only an example. For example, the method 1200 may be performed by another query engine different from that illustrated in FIG. 1, or more generally by a computer. In some embodiments, the method 1200 may be performed on a computing platform, and the computing platform may be an e-commerce platform, such as the e-commerce platform described later.

At step 1202, the method 1200 involves obtaining data related to a plurality of events. The data relating to a plurality of events may be the event data 309 stored in the memory 308 of the query engine 302. The event data 309 may be stored as tables, such as Tables 2A-2C, 3A-3C, and 4A-4C, as shown in FIGS. 2 to 4. The data may be obtained by the query engine 302 over a network through the network interface 306, and (in the context of e-commerce) may include events recorded by one or more merchants and/or partners and/or customers (or potential customers visiting online stores). The event data 309 may include events such as a purchase by a repeat customer or the activation of a blog post by a merchant.

At step 1204, the method 1200 involves configuring the data into a data structure stored in the computer memory. The processor 304 of the query engine 302 may use the event data 309 obtained in step 1202 in order to configure a data structure, that includes, for each event of the plurality events: (1) a first entry recording an occurrence of the event as a transition from a first state prior to the event to a second state subsequent to the event; and, (2) a second entry recording the occurrence of the event as a reverse transition from the second state to the first state. The data structure may be the double entry transition table 311.

For example, the data structure may be the double entry transition table 311 shown in FIG. 5. One occurrence of an event may be a repeat customer purchase from Shop A on Apr 3 at 09:34. This event is shown as the first two rows of the double entry transition table 311 of FIG. 5, and is assigned the index A-1. For this particular event occurrence, the first state is an amount of repeat customer purchases being zero and the second state is an amount of repeat customer purchases being one. The first entry of this event is recorded as row 1 in the table. The first entry records a transition from the amount of repeat customer purchases being zero, as recorded in the column: "Previous Repeat Customer Purchases State", to the amount of repeat customer purchases being one, as recorded in the column: "Current Repeat Customer Purchases State". The second entry of this event is recorded as row 2 in the table, and shows the reverse transition of the event occurrence such that a value of one (i.e., the second state) is provided in the "Previous Repeat Customer Purchases State" column and a value of zero (i.e., the first state) is provided in the "Current Repeat Customer Purchases State".

Optionally, at step 1206, the method includes executing a query to retrieve specific information using the data structure. The query may be written by an analyst or another interested entity via the user device 320, which may then be executed by the query engine 302 via its processor 304.

In some implementations, the specific information requested using the query may be related to the occurrence of a plurality of events, and/or may be associated with a plurality of entities. For instance, the requested information may be related to the events of multiple shops, such as Shop A, Shop B, and Shop C. The event data 309 related to Shop A, Shop B, and Shop C may be used to generate the double entry transition table 311 from which the requested information is retrieved. The requested information may include the number of shops for which an event has occurred, such as the query "How many online stores had three or more repeat customers by the end of the weekend of April 3rd and April 4th?", the execution of which is shown in FIG. 7.

In some implementations, a query executor tool may be used for executing a query at step 1206. A query executor tool may be provided to an analyst via the user interface 328 of their user device 320, which may provide them with an interface that allows them to easily craft a query without the need for scripting. An example of the query executor tool is provided in FIG. 11, in which a query executor interface 1100 is provided to the user via the user device 320. The query executor interface 1100 provides fields in which the user is to enter attributes of the specific information they are requesting from the dataset, and indications of the attributes may be provided to query engine 302. The processor 304 of the query engine 302 may populate a query template with the indications of the attributes provided via the query executor interface 1100, and may subsequently execute the query in conjunction with the double entry transition table 311.

In some implementations, the query executor tool may be configured to receive an indication of the specific information requested by a user, which is related to one or more events associated with an attribute. The query executor tool may then prepare a query in response to the input, as described above. If the double entry transition table 311 is not stored in the memory 308 of the query engine 302, or elsewhere in the computer memory, the processor 304 may execute a command to configure the double entry transition table 311 based on the event data 309 stored in the memory 308, and then execute the query to retrieve the specific information requested by the user. Alternatively, if the double entry transition table 311 is stored in the memory 308 at the time of querying, the processor 304 can access the table and execute the query to retrieve the specific information requested by the user.

In some embodiments, the first entry includes a first value indicative of a direction of the transition from the first state to the second state, and the second entry includes a second value indicative of an opposite direction of the reverse transition from the second state to the first state.

In some embodiments, the first entry includes a first signed numerical value indicative of a direction of a change in state and the second entry includes a second signed numerical value having an opposite sign and an equal magnitude to the first signed numerical value. In the double entry transition table 311 shown in FIG. 5, signed numerical values indicative of a direction of a change in state may be provided in the "Net Change" column.

For example, for the event indexed as A-1 in the double entry transition table 311 of FIG. 5, the first entry recorded for the event may be row 1 and the second entry may be row 2. The first entry includes a signed numerical value "+1" in the "Net Change" column that indicates the change of state as being considered to be in the first direction. Conversely, the second entry includes a signed numerical value of "−1" in the "Net Change" column, which is equal in magnitude and opposite in sign to the value recorded for the first entry. This is indicative of a change in state in the opposite (i.e. second) direction to the change of state of the event in the first entry.

In some embodiments, configuring the data into the data structure in step 1204 includes configuring the data structure to include: a plurality of rows, each pair of rows represents one event; and, a plurality of columns. The plurality of columns includes pairs of columns in which each pair of the pairs of columns represents a change in state of a corresponding attribute in response to an event associated with the corresponding attribute. The plurality of columns also includes a net change column having a plurality of cells, wherein each cell of the plurality of cells is in a respective different one of the plurality of rows, and each cell in the net change column having a value indicative of a direction of change in the state of the corresponding attribute in response to the event associated with the corresponding attribute.

For example, the data structure may be configured as the double entry transition table 311 stored in the memory 308 of the query engine 302. The double entry transition table 311 includes a plurality of rows with each pair representing one event. For instance, row 1 and row 2 of the double entry transition table 311 in FIG. 5 is indicative of one event (a repeat customer purchase in Shop A). The double entry transition table 311 includes a plurality of columns. In the table, there are pairs of columns representing a change in state of an attribute, such as: column 6 and column 7 represent a previous and a current repeat customer purchases state, respectively; column 8 and column 9 represent a previous and a current purchases on mobile app state, respectively; and column 10 and column 11 represent a previous and a current blog activation state, respectively. The double entry transition table 11 of FIG. 5 also includes a "Net Change" column as column 5. The cell of the "Net Change" column of each row indicates a direction of change in state of the attribute relating to the event. For instance, in the first row, the cell in the "Net Change" column has a value of "+1", indicating a change in state in a direction to correspond with the increase in the number of repeat customer purchases.

In some implementations, configuring the data structure may further include storing an additional pair of rows corresponding to a new event. Cells in the additional pair of rows that intersect with a column may correspond to an attribute associated with the new event and record a state transition, and no transition is recorded in other cells in the additional pair of rows that intersect a column corresponding to another attribute not associated with the new event. A new event may be recorded as part of the event data 309 stored in the memory 308. The new event may correspond to two new entries in the double entry transition table 311. If, for instance, the new event is an instance of an additional repeat customer purchase in Shop A on Apr 4th at 22:00, the state transition of the attribute: "repeat customer purchase" may be recorded in the related cells, but the values in the remaining columns relating to other attributes may be the same as the first entry of the previous event. In FIG. 5, for the added row of the first entry, the cell in the "Current Repeat Customer Purchase State" column may be "4" and the value of the cell in the: "Previous Repeat Customer Purchase State" column may be "3". The value of the cells in the remaining columns relating to other attributes would hold the same values as row 15.

In some embodiments, a first row of a pair of the rows includes the first entry, and a first cell intersecting the first row and the net change column has a first value indicative of a direction of the transition from the first state to the second state. A second row of the pair of the rows includes the second entry, and a second cell intersecting the second row and the net change column has a second value indicative of a direction of the reverse transition from the second state to the first state.

For example, the data structure may be configured as the double entry transition table 311 stored in the memory 308 of the query engine 302. A first pair of rows may be row 1 and row 2 of the double entry transition table 311 in FIG. 5. The cell intersecting row 1 and the "Net Change" column may have a value of "+1". This may represent a direction of the transition from a first state, i.e. a state in which the amount of repeat customer purchases is zero, to a second state, i.e. a state in which the amount of repeat customer purchases is one. The cell intersecting row 2 and the "Net Change" column may have a value of "−1". The value of "−1" may represent the reverse transition from the second state to the first state.

In some embodiments, the first value is a first signed numerical value and the second value is a second signed numerical value having an opposite sign and an equal magnitude to the first signed numerical value.

In an example, the first value is indicative of a direction of the transition from the first state to the second state in the "Net Change" column of the double entry transition table 311. The first value in the first row of the first entry of the double entry transition table 311 in FIG. 5 is "−1", which is a signed value. The second signed numerical value is indicative of a direction of the reverse transition from the second state to the first state. The second value, shown in the second row of the first entry of the double entry transition table 311, is "−1", which is opposite in time and equal in magnitude to the first value.

In some embodiments, the method 1200 may further include adding all of the cells in the net change column to result in a sum of zero. In the double entry transition table 311, all of the values in the "Net Change" column may sum to zero, as the two values of the cells in "Net Change" column for each entry (pair of rows) are equal in magnitude and opposite in direction, the values cancel one another out.

In some embodiments, the method 1200 may further include executing a query to retrieve specific information requested by a user. The executing may include filtering out first entries and second entries in the data structure that are not associated with the events related to the specific information requested by the user; and, summing the first signed numerical values of remaining first entries and the second signed numerical values of remaining second entries, wherein a sum is indicative of the specific information requested by the user.

For example, a query requesting the information: "How many shops had greater than or equal to 3 repeat customer purchases on April 3rd/April 4th?" may be requested by a user associated with the user device 320. The processor 304 of the query engine 302 may execute the query as shown in FIG. 7. FIG. 7 shows the filtering of the entries in the data structure in which there are less than three repeat customer purchases, indicated by the hatching out the rows that are not required to retrieve the information requested by the query. The value of the cells in the remaining rows in the "Net Change" column may be summed up to provide the specific information requested by the user. Here, the result of the query is two shops, as described above.

In some embodiments, the query is directed to determining a net change of an attribute over a duration of time. For instance, a user associated with a user device 320 may provide queries to the query engine 302 in order to retrieve specific information from the double entry transition table 311.

Examples of queries related to a net change may include: "What was the net change in the number of online stores having a blog page at the end of the weekend of April 3rd/4th compared to the start of the weekend of April 3rd/4th?", or "How many online stores had three or more repeat customer purchases by the end of the weekend of April 3rd and April 4th?".

In some embodiments, the method further includes transmitting instructions for displaying an output including the specific information requested by the user. In some implementations, the specific requested information may be extracted from/using the double entry transition table 311, and the query engine 302 may provide an output including this information to the user via the user interface 328 of a user device 320. For example, the specific information may be included in web content transmitted to the user device 320 for display on the user interface 328.

In some embodiments, the data structure for each event of the plurality of events further includes at least one of: a timestamp indicating a time at which the respective event occurred; or a unique identifier assigned to the event. In some implementations, the timestamp and the unique identifier may be included as part of the first and/or second entry. For example, the double entry transition table 311 of FIG. 5 includes a third column: "Transition Time Stamp", which provides a timestamp of the occurrence of the event. For the third entry (rows 5 and 6), the time stamp is recorded as "Apr 3 17:25". In some instances, the timestamp may be used to identify an event. The double entry transition table 311 of FIG. 5 also includes a fourth column: "Index", which provides an alpha-numeric identifier unique to each event. The third entry (rows 5 and 6) is assigned the identifier "A-3". As the fourth entry (rows 7 and 8) has the same time stamp as the third entry, the value in the "Index" column may be used to identify the desired entry.

In some embodiments, values in a pair of columns representing a change in state of an attribute may be numeric count values and/or a binary state. An example of binary states is "True" and "False", as is the case for the attribute "Blog Activation State". In some embodiments, values in a pair of columns representing a change in state of an attribute may be text strings. An example of an attribute whose states are represented by a text string may be a subscription status of a user, and the values of this attribute may be "gold", "silver" and bronze.

In some embodiments, the information associated with the plurality of events is associated with a plurality of entities (e.g. multiple shops). In some embodiments, the events may relate to operation of a computing platform. The computing platform may be an e-commerce platform.

In some embodiments, a system is provided for performing the methods described above. The system may include a memory (e.g. memory 308) to store information such as the event data 309 and the double entry transition table 311. The system may further include at least one processor (e.g. processor 304) to perform operations such as: configuring data into a data structure stored in computer memory (e.g. memory 308), the data representing information associated with a plurality of events (e.g., configuring the double entry transition table 311 of FIG. 5). The data structure configured by the processor 304 may include, for each event of the plurality of events: a first entry recording an occurrence of the event as a transition from a first state prior to the event to a second state subsequent to the event, and, a second entry recording the occurrence of a same event as the event recorded in the first entry, the same event recorded in the second entry as a reverse transition from the second state back to the first state.

In some embodiments, a computer-readable medium is provided having stored thereon computer-executable instructions that, when executed by a computer, cause the computer to perform method steps described above.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 13:
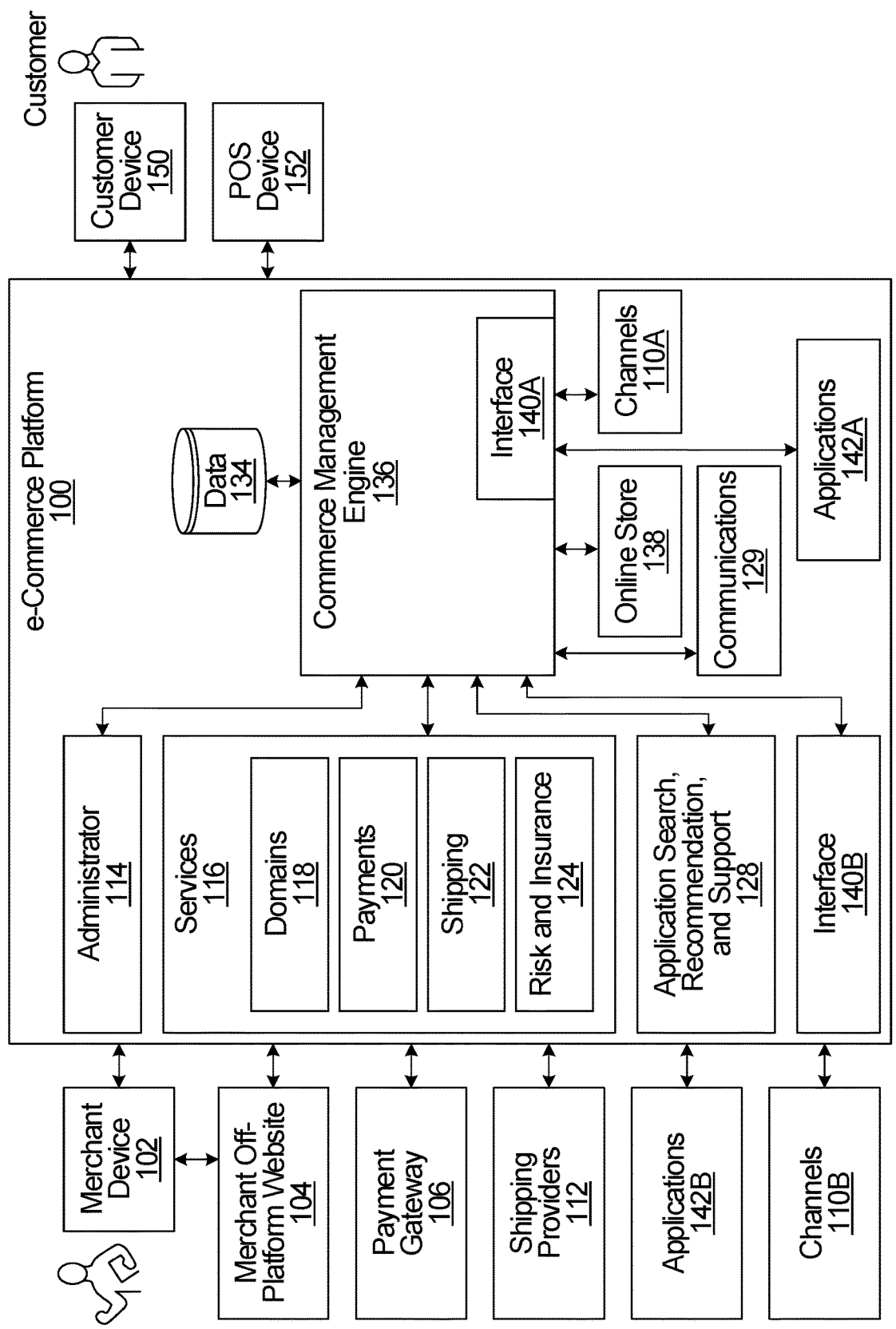
FIG. 13 is a block diagram of an e-commerce platform, according to one embodiment.

FIG. 13 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 13, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 14 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 14. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 13, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Configuring Data Structures in the e-Commerce Platform 100

Figure 15:
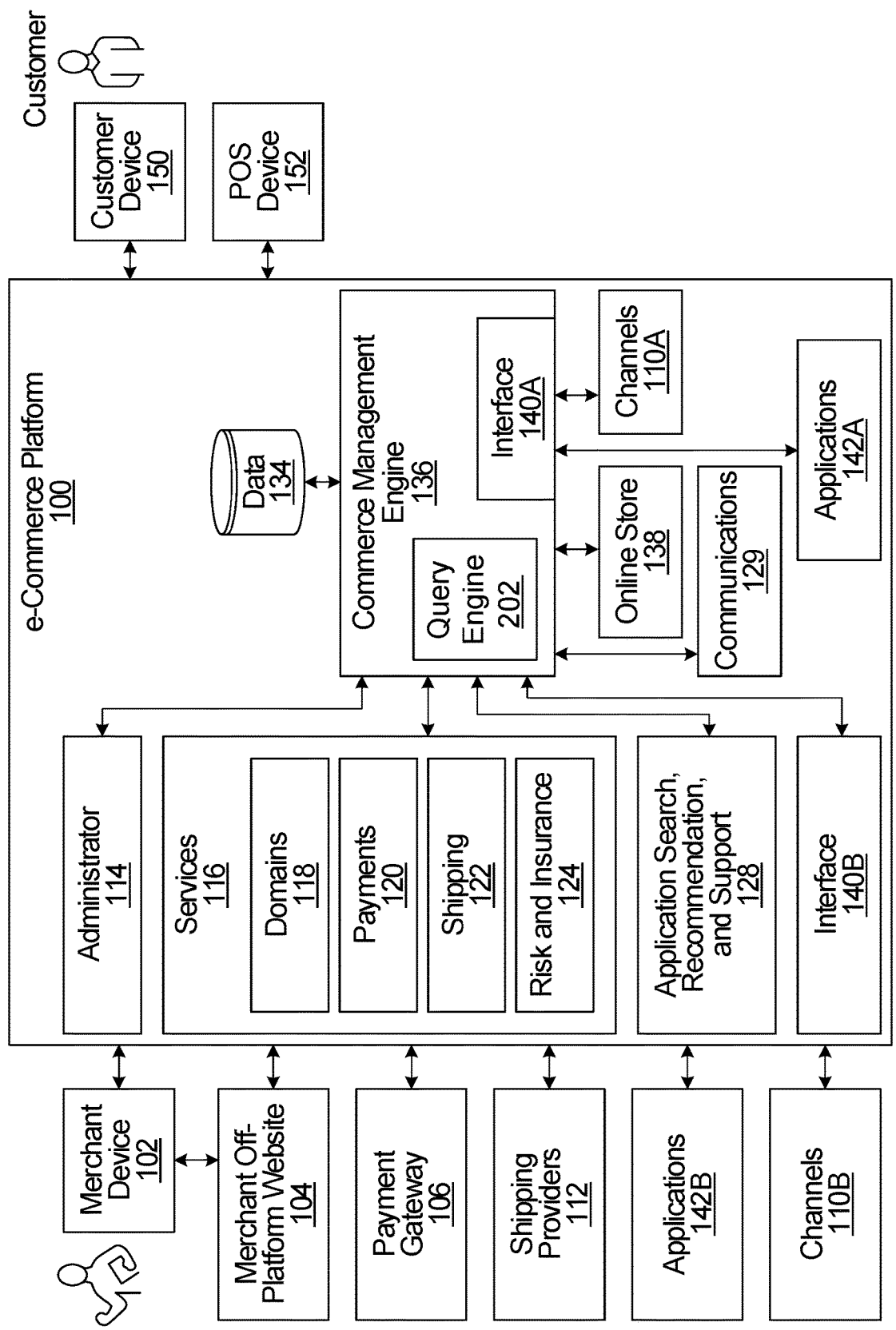
FIG. 15 illustrates the e-commerce platform of FIG. 13, but with a query engine, according to one embodiment.

FIG. 15 illustrates the e-commerce platform 100 of FIG. 13, but with the addition of a query engine 202. The query engine 202 may be embodied as part of the commerce management engine 136. The query engine 202 performs the data structure generating methods disclosed herein. For example, the query engine 202 may configure a double entry transition table based on events recorded in memory in the manner described herein. The query engine 202 may be implemented by one or more general-purpose processors that execute instructions stored in a memory (e.g. stored in the data 134) or stored in another non-transitory computer-readable medium. The instructions, when executed, cause the query engine 202 to perform the operations of the query engine 202, e.g., operations relating to obtaining data related to a plurality events and configuring the data into a double entry transition table stored in memory. Alternatively, some or all of the query engine 202 may be implemented using dedicated circuitry, such as an ASIC, a GPU, or a FPGA. In some embodiments, the query engine 202 may be located inside the e-commerce platform 100 but external to, and coupled to, the commerce management engine 136. In some embodiments, the query engine 202 may instead be located externally to the e-commerce platform 100 and possibly coupled to the commerce management engine 136.

Although the query engine 202 in FIG. 15 is illustrated as a distinct component of the e-commerce platform 100 in commerce management engine 136, this is only an example. The query engine 202 could also or instead be provided by another component residing within or external to the e-commerce platform 100. In some embodiments, either or both of the applications 142A-B may provide the query engine 202 that implements the functionality described herein. The location of the query engine 202 is implementation specific. In some implementations, the query engine 202 is provided at least in part by an e-commerce platform, either as a core function of the e-commerce platform or as an application or service supported by or communicating with the e-commerce platform.

In some embodiments, at least a portion of query engine 202 could be implemented in a user device. For example, a user device could store and run at least some of the query engine 202 locally as a software application.

Although the embodiments described herein may be implemented using the query engine 202 in e-commerce platform 100, the embodiments are not limited to the specific e-commerce platform 100 of FIGS. 13 to 15 and could be used in connection with any e-commerce platform. Also, the embodiments described herein need not necessarily be implemented in association with an e-commerce platform, but might instead be implemented as a standalone component or service.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A system comprising:
at least one hardware processor to configure data into a data structure stored in computer memory, the data representing information associated with a plurality of events; and,
the data structure including, for each event of the plurality of events, two entries related to a same single occurrence of the event, the two entries including:
a first entry recording the occurrence of the event as a transition from a first state prior to the event to a second state subsequent to the event, and,
a different second entry also recording the occurrence of the event, but the second entry recording the occurrence of the event as a reverse transition from the second state back to the first state.

2. The system of claim 1, wherein the first entry includes a first value indicative of a direction of the transition from the first state to the second state, and the second entry includes a second value indicative of an opposite direction of the reverse transition from the second state to the first state.

3. The system of claim 2, wherein the first value is a first signed numerical value and the second value is a second signed numerical value having an opposite sign and an equal magnitude to the first signed numerical value.

4. The system of claim 1, wherein the data structure comprises:
a plurality of rows, wherein each pair of the rows represents one event; and
a plurality of columns, including:
pairs of columns in which each pair of the pairs of columns represents a change in state of a corresponding attribute in response to an event associated with the corresponding attribute, and
a net change column having a plurality of cells, wherein each cell of the plurality of cells is in a respective different one of the plurality of rows, and each cell in the net change column having a value indicative of a direction of change in the state of the corresponding attribute in response to the event associated with the corresponding attribute.

5. The system of claim 4,
wherein a first row of a pair of the rows includes the first entry, and a first cell intersecting the first row and the net change column has a first value indicative of a direction of the transition from the first state to the second state; and,
wherein a second row of the pair of the rows includes the second entry, and a second cell intersecting the second row and the net change column has a second value indicative of an opposite direction of the reverse transition from the second state to the first state.

6. The system of claim 5, wherein the first value is a first signed numerical value and the second value is a second signed numerical value having an opposite sign and an equal magnitude to the first signed numerical value.

7. The system of claim 4, wherein addition of all of the cells in the net change column results in a sum of zero.

8. The system of claim 1, wherein the data structure for each event of the plurality of events further includes at least one of:
a timestamp indicating a time at which the event occurred; or,
a unique identifier assigned to the event.

9. A computer-implemented method comprising:
obtaining data related to a plurality of events,
configuring the data into a data structure stored in computer memory,
the data structure including, for each event of the plurality of events, two entries related to a same single occurrence of the event, the two entries including:
a first entry recording the occurrence of the event as a transition from a first state prior to the event to a second state subsequent to the event; and,
a different second entry also recording the occurrence of the event, but the second entry recording the occurrence of the event as a reverse transition from the second state back to the first state.

10. The computer-implemented method of claim 9, wherein the first entry includes a first value indicative of a direction of the transition from the first state to the second state, and the second entry includes a second value indicative of an opposite direction of the reverse transition from the second state to the first state.

11. The computer-implemented method of claim 10, wherein the first value is a first signed numerical value and the second value is a second signed numerical value having an opposite sign and an equal magnitude to the first signed numerical value.

12. The computer-implemented method of claim 9, wherein configuring the data into the data structure comprises configuring the data structure to include:
a plurality of rows, each pair of rows represents one event; and
a plurality of columns, including:

pairs of columns in which each pair of the pairs of columns represents a change in state of a corresponding attribute in response to an event associated with the corresponding attribute, and a net change column having a plurality of cells, wherein each cell of the plurality of cells is in a respective different one of the plurality of rows, and each cell in the net change column having a value indicative of a direction of change in the state of the corresponding attribute in response to the event associated with the corresponding attribute.

13. The computer-implemented method of claim 12, wherein a first row of a pair of the rows includes the first entry, and a first cell intersecting the first row and the net change column has a first value indicative of a direction of the transition from the first state to the second state; and, wherein a second row of the pair of the rows includes the second entry, and a second cell intersecting the second row and the net change column has a second value indicative of a direction of the reverse transition from the second state to the first state.

14. The computer-implemented method of claim 13, wherein the first value is a first signed numerical value and the second value is a second signed numerical value having an opposite sign and an equal magnitude to the first signed numerical value.

15. The computer-implemented method of claim 12, further comprising adding all of the cells in the net change column to result in a sum of zero.

16. The computer-implemented method of claim 11, further comprising executing a query to retrieve specific information requested by a user, the executing including:

filtering out first entries and second entries in the data structure that are not associated with the events related to the specific information requested by the user; and, summing the first signed numerical values of remaining first entries and the second signed numerical values of remaining second entries, wherein a sum is indicative of the specific information requested by the user.

17. The computer-implemented method of claim 16, wherein the query is directed to determining a net change of an attribute over a duration of time.

18. The computer-implemented method of claim 16, further comprising transmitting instructions for displaying an output including the specific information requested by the user.

19. The computer-implemented method of claim 9, wherein the data structure for each event of the plurality of events further includes at least one of:

a timestamp indicating a time at which the respective event occurred; or, a unique identifier assigned to the event.

20. A non-transitory computer readable medium having stored thereon computer-executable instructions that, when executed by a computer, cause the computer to perform operations comprising:

obtaining data related to a plurality of events, configuring the data into a data structure stored in computer memory, the data structure including, for each event of the plurality of events, two entries related to a same single occurrence of the event, the two entries including:

a first entry recording the occurrence of the event as a transition from a first state prior to the event to a second state subsequent to the event; and, a different second entry also recording the occurrence of the event, but the second entry recording the occurrence of the event a same event as a reverse transition from the second state back to the first state.

\* \* \* \* \*

UNITED STATES PATENT AND TRADEMARK OFFICE
CERTIFICATE OF CORRECTION

PATENT NO. : 11,797,526 B2
APPLICATION NO. : 17/476623
DATED : October 24, 2023
INVENTOR(S) : Benjamin Alfred Lucas Doyle It is certified that error appears in the above-identified patent and that said Letters Patent is hereby corrected as shown below:

In the Claims

At Column 36, Line 33, Claim 20: "occurrence of the event a same event as a reverse" should be
– occurrence of the event as a reverse –

Signed and Sealed this
Twenty-eighth Day of November, 2023

Katherine Kelly Vidal
*Director of the United States Patent and Trademark Office*